United States Patent
Li et al.

(10) Patent No.: US 11,968,016 B2
(45) Date of Patent: *Apr. 23, 2024

(54) CHANNEL QUALITY INDICATION (CQI) SATURATION MITIGATION

(71) Applicant: Telefonaktiebolaget LM Ericsson (publ), Stockholm (SE)

(72) Inventors: Shaohua Li, Kanata (CA); Sebastian Faxér, Stockholm (SE); Kevin Luo, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/915,304

(22) PCT Filed: Mar. 30, 2021

(86) PCT No.: PCT/IB2021/052657
§ 371 (c)(1),
(2) Date: Sep. 28, 2022

(87) PCT Pub. No.: WO2021/198928
PCT Pub. Date: Oct. 7, 2021

(65) Prior Publication Data
US 2023/0122910 A1   Apr. 20, 2023

Related U.S. Application Data

(60) Provisional application No. 63/002,624, filed on Mar. 31, 2020.

(51) Int. Cl.
*H04B 7/06* (2006.01)
*H04W 52/24* (2009.01)

(52) U.S. Cl.
CPC ........ *H04B 7/0632* (2013.01); *H04W 52/241* (2013.01); *H04W 52/243* (2013.01)

(58) Field of Classification Search
CPC . H04B 7/0632; H04W 52/241; H04W 52/243
See application file for complete search history.

(56) References Cited

U.S. PATENT DOCUMENTS

| | | | |
|---|---|---|---|
| 9,954,667 B2 * | 4/2018 | Papasakellariou | ...... H04L 5/001 |
| 11,088,746 B2 * | 8/2021 | Gao | ...................... H04W 24/08 |

(Continued)

FOREIGN PATENT DOCUMENTS

| | | | | |
|---|---|---|---|---|
| CN | 103857054 B | * | 6/2017 | |
| CN | 112136281 A | * | 12/2020 | ........... H04B 7/0417 |

(Continued)

OTHER PUBLICATIONS

International Search Report and Written Opinion dated Jun. 14, 2021 issued in PCT Application No. PCT/IB2021/052657, consisting of 12 pages.

(Continued)

*Primary Examiner* — Parth Patel
(74) *Attorney, Agent, or Firm* — Weisberg I.P. Law, P.A.

(57) ABSTRACT

According to some embodiments, a network node configured to communicate with a wireless device is provided. The network node includes processing circuitry configured to: configure a first measurement resource for channel measurements, configure a second measurement resource for interference measurements, cause transmission of a first signal with a first predefined power level in a transmission occasion of the first measurement resource, and cause transmission of a second signal with a second predefined power level in a transmission occasion of the second measurement resource where at least one of the first predefined power level and the second predefined power level is configured to at least in part mitigate channel quality indication, CQI, saturation.

16 Claims, 12 Drawing Sheets

(56) References Cited

U.S. PATENT DOCUMENTS

| | | | |
|---|---|---|---|
| 11,617,095 B2* | 3/2023 | Gao | H04L 5/0051 370/252 |
| 2013/0072123 A1* | 3/2013 | Garavaglia | H04W 24/10 455/63.1 |
| 2013/0196675 A1* | 8/2013 | Xiao | H04W 24/08 455/452.1 |
| 2013/0301450 A1* | 11/2013 | Geirhofer | H04B 7/024 370/252 |
| 2014/0086084 A1* | 3/2014 | Bi | H04W 72/541 370/252 |
| 2014/0369283 A1* | 12/2014 | Ge | H04W 72/541 370/329 |
| 2014/0369291 A1* | 12/2014 | Zhang | H04B 7/024 370/329 |
| 2015/0171948 A1* | 6/2015 | Xiao | H04B 17/309 370/252 |
| 2015/0263796 A1* | 9/2015 | Nam | H04L 5/0094 370/329 |
| 2016/0149679 A1* | 5/2016 | Frenne | H04L 5/005 370/329 |
| 2016/0277942 A1* | 9/2016 | Chande | H04L 5/0058 |
| 2016/0301505 A1* | 10/2016 | Furuskog | H04W 72/00 |
| 2017/0230137 A1* | 8/2017 | Tang | H04W 72/0473 |
| 2018/0076873 A1* | 3/2018 | Xiao | H04W 24/08 |
| 2018/0102840 A1* | 4/2018 | Jiang | H04J 14/02 |
| 2019/0068303 A1 | 2/2019 | Gao et al. | |
| 2019/0297519 A1* | 9/2019 | Han | H04L 5/00 |
| 2019/0356364 A1* | 11/2019 | Maamari | H04L 5/0051 |
| 2020/0322022 A1* | 10/2020 | Gao | H04L 5/0048 |
| 2021/0297135 A1* | 9/2021 | Kim | H04B 7/0617 |
| 2021/0328648 A1* | 10/2021 | Gao | H04B 17/336 |
| 2022/0052736 A1* | 2/2022 | Gao | H04B 7/0626 |
| 2022/0264343 A1* | 8/2022 | Guo | H04W 24/08 |
| 2022/0360309 A1* | 11/2022 | Long | H04B 17/336 |
| 2023/0122910 A1* | 4/2023 | Li | H04W 52/243 370/329 |

FOREIGN PATENT DOCUMENTS

| | | |
|---|---|---|
| WO | 2010/048471 A1 | 4/2010 |
| WO | 2016/095826 A1 | 6/2016 |
| WO | 2020/038548 A1 | 2/2020 |
| WO | 2020/169195 A1 | 8/2020 |

OTHER PUBLICATIONS

3GPP TS 36.213 V15.4.0 (Dec. 2018); 3rd Generation Partnership Project; Technical Specification Group Radio Access Network; Evolved Universal Terrestrial Radio Access (E-UTRA); Physical Layer Procedures (Release 15), consisting of 550 pages.

3GPP TS 38.331 V15.4.0 (Dec. 2018); 3rd Generation Partnership Project; Technical Specification Group Radio Access Network; NR; Radio Resource Control (RRC) Protocol Specification (Release 15), consisting of 474 pages.

3GPP TS 38.214 V15.4.0 (Dec. 2018); 3rd Generation Partnership Project; Technical Specification Group Radio Access Network; NR; Physical Layer Procedures for Data (Release 15), consisting of 102 pages.

* cited by examiner

US 11,968,016 B2

CHANNEL QUALITY INDICATION (CQI) SATURATION MITIGATION

CROSS-REFERENCE TO RELATED APPLICATIONS

This application is a Submission Under 35 U.S.C. § 371 for U.S. National Stage Patent Application of International Application Number: PCT/IB2021/052657, filed Mar. 30, 2021 entitled "CHANNEL QUALITY INDICATION (CQI) SATURATION MITIGATION," which claims priority to U.S. Provisional Application No. 63/002,624, filed Mar. 31, 2020, entitled "CQI SATURATION MITIGATION IN MU-MIMO WITH UE CAPABILITY CONSTRAINT," the entireties of both of which are incorporated herein by reference.

TECHNICAL FIELD

Wireless communication and in particular, channel quality indication (CQI) saturation mitigation.

BACKGROUND

In wireless communications, multiple-input and multiple-output (MIMO) technology is becoming more and more popular and has been incorporated into wireless broadband standards like 4$^{th}$ Generation (4G) Long Term Evolution (LTE) and 5$^{th}$ Generation (5G) New Radio (NR). Downlink (DL) multi-user MIMO or simply DL MU-MIMO allows one network node (e.g., eNB or gNB) to communicate with multiple wireless devices (e.g., user equipment (UE)) simultaneously using the same time frequency resource. Downlink MU-MIMO is usually a close-loop MIMO system, i.e., the downlink channel state information (CSI) perceived on the wireless device is feedback to the network node and used by network node to determine downlink transmission format, i.e., transmission block size (TBS), rank and modulation and coding rate scheme (MCS). The CSI reporting as specified in Third Generation Partnership Project (3GPP) 4G LTE and 5G NR assumes single user (SU) MIMO transmission as a wireless device does not know, when it sends the CSI report, how and which multiple wireless devices it will be paired with in future transmissions. This SU CSI report is not accurate if it is directly used to determine MU MIMO transmission format when multiple wireless devices are paired together for downlink transmission. The reason is that, first, the downlink transmit power will be shared by all paired wireless devices; and second, multiple paired wireless devices together using same time/frequency resource for transmission will introduce additional inter-stream interference. Both power sharing and inter-stream interference from other paired wireless devices will contribute to the decrease of signal to interference plus noise ratio (SINR) for each paired wireless device and create a gap between actual MU-MIMO CSI and wireless device reported CSI.

To help accurately determine downlink transmission format and achieve optimal throughput and block error rate, additional downlink CSI estimation may need to be performed on and/or by the network node for MU MIMO transmission. This additional downlink CSI estimation on the network node uses wireless device reported CSI as input to set an absolute reference for downlink signal power as well as noise and interference power, based on what is perceived by wireless device. Note that channel quality indication (CQI) can be considered as quantized downlink post equalization SINR. One issue with wireless device's CSI report is CQI saturation. In case actual downlink post equalization SINR is higher than the SINR corresponding to highest CQI, i.e., CQI of 15, the reported CQI SINR will be capped. This will happen with massive MIMO systems with large number of antennas which provide very high beam-forming gain. FIG. 1 illustrates such a system. A typical massive MIMO system consists of two-dimensional antenna elements array with M rows, N columns and K polarizations (K=2 in case of cross-polarization).

Using capped SINR for MU-MIMO CSI estimation will result in over conservative SINR estimation for MU-MIMO transmission. In practical wireless communication systems, this kind of CSI estimation error will be compensated by an outer-loop link adaptation which is driven by downlink ACK/NACK, feedbacked by wireless device after transport block detection. When CSI estimation error is big, outer-loop link adaptation needs long time to converge and results in degraded performance.

CQI Saturation Issue

A CSI report includes channel quality indication (CQI), precoding matrix indication (PMI) and rank indication (RI) and CSI-RS resource indication (CRI). CQI can be considered as quantized SINR to achieve as closely as possible the desired coding rate indicated by CQI index for reported PMI and RI (3GPP TS 36.213 for LTE and 3GPP TS38.214 for NR). The highest CQI index 15 represents SINR needed to achieved highest coding rate supported by standard for given PMI and RI, which is roughly 20 dB for LTE and NR when 64 QAM is used and about 27 dB when 256 QAM is configured.

Let $\gamma_{CQI15}$ be the SINR corresponding to CQI 15. In case the actual downlink post equalization SINR is higher than $\gamma_{CQI15}$, CQI 15 will be reported as illustrated in FIG. 2. That is, CQI 1 to the first instance of CQI 15 in FIG. 2 corresponds to a linear or substantially linear region where increased SINR corresponds to an increase in CQI, which corresponds to a non-saturated region. However, after the first instance of CQI 15, every increase in SINR does not correspond to an increase in CQI as the maximum reportable CQI is 15, which corresponds to a saturated region. This means, for example, that SINR of 20 will be reported as CQI 15 even though the first instant of CQI 15 corresponds to an SINR of 18. Hence the network node has no knowledge of the actual downlink SINR when CQI 15 is reported.

As previously described, when multiple wireless devices are paired together for MU transmission, the wireless device reported CQI will be reduced due to the power split between wireless devices and due to extra inter-stream interference between paired wireless devices. In case the actual downlink SINR is much higher than $\gamma_{CQI15}$, the estimated MU-MIMO SINR on and/or by the network node will be conservative (i.e., lower or substantially lower than the actual DL SINR) as illustrated in FIG. 3 and result in poor system performance.

There currently exist certain challenge(s) with respect to trying to resolve the CQI saturation issue.

To solve the CQI saturation issue, one solution is to configure multiple CSI-RS resources for each wireless device to an extended CQI linear range at low end and high end of SINR. As one alternative, for different CSI-RS resources, a different powerControlOffset is configured for different CSI-RS resources. With the help of powerControlOffset, the wireless device can scale down (or up) the signal first and then estimate the SINR, so that the wireless device can shift the SNR range in the CQI report from [−9 dB, 20 dB] to [(−9+powerControlOffset)dB, (20+powerControlOffset)dB], thereby helping reduce the CQI saturation probability. As another alternative, different number of CSI-RS antenna ports and/or different beamforming are performed for different CSI-RS resources. By reducing the beamforming gain, the CQI can tolerate higher received signal, thus reduce the CQI saturation probability.

Configuring multiple CSI-RS resources generally need for the wireless device to support more CSI-RS ports. For example, most of existing commercial networks utilize 32-port CSI-RS to achieve optimum performance Therefore, when two CSI-RS resources are configured, the total Tx ports the wireless device needs to support is 64 (32+32). However, due to CSI-RS complexity restriction, most of commercial wireless devices only support up to 32 ports in total.

To combat the wireless device capability constraint, one low complexity solution is to configure two CSI-RS resources and each with less antenna ports, i.e., 16 ports or less. Since less CSI-RS antenna ports are used for CSI feedback, this will negatively impact the CSI feedback accuracy and thus introduce some performance loss for type-I codebook based SU-MIMO performance. Furthermore, if 16 ports are configured for MU-MIMO and 32 ports are configured for SU-MIMO, this will break the smooth switch between SU-MIMO and MU-MIMO which is important for real world systems.

SUMMARY

Some embodiments advantageously provide a method and system for CQI saturation mitigation.

In the present disclosure, given limited wireless device capability to mitigate the CQI saturation issue, multiple embodiments are described herein that help mitigate CQI saturation. Certain aspects of the present disclosure and their embodiments may provide solutions to these or other challenges.

The present disclosure includes several embodiments of methods, which can be deployed jointly, to mitigate the CQI saturation issue for wireless devices with limited CSI feedback capability for downlink massive MIMO systems. These embodiments may include:

a. configuring one non-zero power (NZP) CSI-reference signal (RS) resource for channel measurements and one CSI-interference measurement (IM) resource for interference measurements. In some embodiments, in CSI-IM, a signal with a non-zero transmission power is transmitted. The transmission power is adjusted to control the wireless device observed SINR, thus changing/modifying the CQI that the wireless device reports. In other embodiments, in time domain, in a first CSI-IM resource transmission occasion, a signal with a first transmission power is transmitted, whereas in a second CSI-IM resource transmission occasion(s), signal with a second transmission power level is transmitted, so that wireless device can provide two or more kinds of feedbacks over time, each report is with different SINR, some is with higher SINR, and some is with lower SINR, while configuring "timeRestrictionForInterferenceMeasurements" to avoid wireless device to perform any interference average across time.

b. Configuring one NZP CSI-RS resource for channel measurements and two or more CSI-IM resources for interference measurements. In some embodiments, in a first CSI-IM resource, a signal with the first transmission power is transmitted. In a second CSI-IM resource, a signal with a second transmission power is transmitted. Multiple trigger states may be defined for CSI report. At least one trigger state is associated with the report with the first CSI-IM resource and another trigger state is associated with the report with the second CSI-IM resource. Thus, multiple CQIs can be reported by wireless device.

c. Configuring one NZP CSI-RS resource for channel measurements and one NZP-CSI-RS-Resource for Interference measurements. In some embodiments, nzp-CSI-RS-ResourcesForInterference is transmitted. The transmission power is used to control the wireless device observed SINR thus change wireless device reported CQI. In other embodiments, in time domain, in a first nzp-CSI-RS-ResourcesForInterference resource transmission occasion, signal with a first transmission power is transmitted, whereas in a second nzp-CSI-RS-ResourcesForInterference resource transmission occasion, signal with a second transmission power level is transmitted, so that wireless device can provide two or more kinds of feedbacks, each report is with different SINR, some report(s) are with higher SINR and some report(s) are with lower SINR, while configuring "timeRestrictionForInterferenceMeasurements" to avoid wireless device to perform any interference average across time.

d. Configuring one NZP CSI-RS resource for channel measurements and two or more nzp-CSI-RS-Resources for interference measurements. In some embodiments, in a first nzp-CSI-RS-ResourcesForInterference, a signal with the first transmission power is transmitted. In a second nzp-CSI-RS-ResourceForInterference, a signal with a second transmission power, so that the wireless device can feedback a plurality of feedback, each feedback is with different SINR, thus the CQI saturation issue can be eliminated. In other embodiments, same REs and same transmission power are applied to two nzp-CSI-RS-ResourcesForInterference, but different powerControlOffset is associated with nzp-CSI-RS-ResourcesForInterference. Since the same REs are used, although two nzp-CSI-RS-ResourcesForInterference are configured, the overhead to transmit two nzp-CSI-RS-ResourcesForInterference is the same as that for one nzp-CSI-RS-ResourceForInterference. As a result, the CSI-RS overhead is reduced.

e. Configuring one CSI-RS resource for channel measurements and using RRC to configure the powerControlOffset based on a wireless device condition. In some embodiments, checking wireless device CQI report, if the CQI report is larger than a first threshold for a first time-duration, the network node (e.g., gNB) uses RRC to configure the first powerControlOffset for the CSI-RS resource for channel measurements for the given wireless device. Otherwise, the network node uses RRC to configure the second powerControlOffset for the CSI resource for channel measurements, so that the wireless device can have different back off for the CQI report. Thus, the CQI saturation issues can be mitigated.

It should be noted that any of the above-mentioned transmission powers can be zero. When the transmission power is zero, this means that nothing is transmitted on that CSI-IM or nzp-CSI-RS-ResourcesForInterference.

There are, described herein, various embodiments which address one or more of the issues described above.

Certain embodiments may provide one or more of the following technical advantage(s). Embodiments of the methods disclosed herein enable a wireless device with limited capability to have multiple CSI report(s) to mitigate the SINR saturation issue encountered in downlink massive MU-MIMO system. With these embodiments, the CSI estimation on the base station will be more accurate which may improve massive MU-MIMO performance in 4G LTE and 5G NR systems, for example.

According to one aspect of the disclosure, a network node configured to communicate with a wireless device is provided. The network node includes processing circuitry configured to: configure a first measurement resource for channel measurements, configure a second measurement resource for interference measurements, cause transmission of a first signal with a first predefined power level in a transmission occasion of the first measurement resource and cause transmission of a second signal with a second predefined power level in a transmission occasion of the second measurement resource where at least one of the first predefined power level and the second predefined power level is configured to at least in part mitigate channel quality indication, CQI, saturation.

According to one or more embodiments of this aspect, the first measurement resource is a non-zero power channel state information-reference signal, NZP CSI-RS, resource. According to one or more embodiments of this aspect, the second measurement resource is a channel state information-interference measurement, CSI-IM, resource. According to one or more embodiments of this aspect, the second measurement resource is a non-zero power channel state information-reference signal, NZP CSI-RS, resource.

According to one or more embodiments of this aspect, the processing circuitry is further configured to: cause transmission of a third signal with a third predefined power level in another transmission occasion of the second measurement resource, receive a first reported CQI associated with the second signal, and receive a second reported CQI associated with the third signal where the first reported CQI is different than the second reported CQI. The processing circuitry is further configured to estimate a signal to interference plus noise ratio, SINR, based on at least one of the first reported CQI and second reported CQI, and perform at least one action based at least in part on the estimated SINR. According to one or more embodiments of this aspect, the processing circuitry is further configured to: receive a first reported CQI associated with the first signal and the second signal, estimate a signal to interference plus noise ratio, SINR, based on the first reported CQI, and perform at least one action based at least in part on the estimated SINR. According to one or more embodiments of this aspect, the at least one action includes performing at least one of link adaptation and a modulation and coding rate decision.

According to one or more embodiments of this aspect, the at least one of the first predefined power level and second predefined power level is configured to at least in part mitigate CQI saturation by causing a signal to interference plus noise ratio, SINR, observed by a wireless device to change where the observed SINR maps to a reportable CQI. According to one or more embodiments of this aspect, the at least in part mitigating of CQI saturation corresponds to causing a reportable CQI to change from saturated CQI to non-saturated CQI by changing a signal to interference plus noise ratio, SINR, observed by the wireless device. According to one or more embodiments of this aspect, the processing circuitry is further configured to: configure a third measurement resource for interference measurements, and cause transmission of a third signal with a third predefined power level in a transmission occasion of the third measurement resource. At least one of the first predefined power level, the second predefined power level and the third predefined power level is configured to at least in part mitigate channel quality indication, CQI, saturation.

According to another aspect of the disclosure, a wireless device configured to communicate with a network node is provided. The wireless device includes processing circuitry configured to: perform channel measurements based on a first signal with a first predefined power level that is received in a transmission occasion of a first measurement resource that is configured for channel measurements, perform interference measurements based on a second signal with a second predefined power level that is received in a transmission occasion of a second measurement resource that is configured for interference measurements where at least one of the first predefined power level and the second predefined power level is configured to at least in part mitigate channel quality indication, CQI, saturation, and report a first CQI based at least on one of the channel measurements of the first signal and the interference measurements of the second signal.

According to one or more embodiments of this aspect, the first measurement resource is a non-zero power channel state information reference signal, NZP CSI-RS, resource. According to one or more embodiments of this aspect, the second measurement resource is a channel state information-interference measurement, CSI-IM, resource. According to one or more embodiments of this aspect, the second measurement resource is a non-zero power channel state information reference signal, NZP CSI-RS, resource.

According to one or more embodiments of this aspect, the processing circuitry is further configured to perform interference measurements based on a third signal with a third predefined power level that is received in another transmission occasion of the second measurement resource that is configured for interference measurements, and report a second CQI associated with the interference measurements of the third signal where the first CQI is a different than the second CQI and is associated with the interference measurements of the second signal. According to one or more embodiments of this aspect, the processing circuitry is further configured to observe CQI that has been changed by the at least one of the first predefined power level and second predefined power level for at least in part mitigating CQI saturation. According to one or more embodiments of this aspect, the at least in part mitigating of CQI saturation corresponds to reporting a CQI that has changed from saturated CQI to a non-saturated CQI. According to one or more embodiments of this aspect, the processing circuitry is further configured to: perform interference measurements based on a third signal with a third predefined power level that is received in a transmission occasion of a third measurement resource that is configured for interference measurements, and at least one of the first predefined power level, the second predefined power level and the third predefined power level is configured to at least in part mitigate channel quality indication, CQI, saturation.

According to another aspect of the disclosure, a method implemented by a network node that is configured to communicate with a wireless device is provided. A first measurement resource for channel measurements is configured. A second measurement resource for interference measurements is configured. Transmission of a first signal with a first predefined power level in a transmission occasion of the first measurement resource is caused. Transmission of a second signal with a second predefined power level in a transmission occasion of the second measurement resource is caused where at least one of the first predefined power level and the second predefined power level is configured to at least in part mitigate channel quality indication, CQI, saturation.

According to one or more embodiments of this aspect, the first measurement resource is a non-zero power channel state information-reference signal, NZP CSI-RS, resource. According to one or more embodiments of this aspect, the second measurement resource is a channel state information-interference measurement, CSI-IM, resource. According to one or more embodiments of this aspect, the second measurement resource is a non-zero power channel state information-reference signal, NZP CSI-RS, resource.

According to one or more embodiments of this aspect, transmission of a third signal with a third predefined power level in another transmission occasion of the second measurement resource is caused. A first reported CQI associated with the second signal is received. A second reported CQI associated with the third signal is received where the first reported CQI is different than the second reported CQI. A signal to interference plus noise ratio, SINR, is estimated based on at least one of the first reported CQI and second reported CQI, and at least one action is performed based at least in part on the estimated SINR. According to one or more embodiments of this aspect, a first reported CQI associated with the first signal and the second signal is received. A signal to interference plus noise ratio, SINR, is estimated based on the first reported CQI. At least one action is performed based at least in part on the estimated SINR. According to one or more embodiments of this aspect, the at least one action includes performing at least one of link adaptation and a modulation and coding rate decision.

According to one or more embodiments of this aspect, the at least one of the first predefined power level and second predefined power level is configured to at least in part mitigate CQI saturation by causing a signal to interference plus noise ratio, SINR, observed by a wireless device to change where the observed SINR maps to a reportable CQI. According to one or more embodiments of this aspect, the at least in part mitigating of CQI saturation corresponds to causing a reportable CQI to change from saturated CQI to non-saturated CQI by changing a signal to interference plus noise ratio, SINR, observed by the wireless device. According to one or more embodiments of this aspect, a third measurement resource for interference measurements is configured. Transmission of a third signal with a third predefined power level in a transmission occasion of the third measurement resource is caused. At least one of the first predefined power level, the second predefined power level and the third predefined power level is configured to at least in part mitigate channel quality indication, CQI, saturation.

According to another aspect of the disclosure, a method implemented by a wireless device that is configured to communicate with a network node is provided. Channel measurements are performed based on a first signal with a first predefined power level that is received in a transmission occasion of a first measurement resource that is configured for channel measurements. Interference measurements are performed based on a second signal with a second predefined power level that is received in a transmission occasion of a second measurement resource that is configured for interference measurements where at least one of the first predefined power level and the second predefined power level is configured to at least in part mitigate channel quality indication, CQI, saturation. A first CQI is reported based at least on one of the channel measurements of the first signal and the interference measurements of the second signal.

According to one or more embodiments of this aspect, the first measurement resource is a non-zero power channel state information reference signal, NZP CSI-RS, resource. According to one or more embodiments of this aspect, the second measurement resource is a channel state information-interference measurement, CSI-IM, resource. According to one or more embodiments of this aspect, the second measurement resource is a non-zero power channel state information reference signal, NZP CSI-RS, resource.

According to one or more embodiments of this aspect, interference measurements are performed based on a third signal with a third predefined power level that is received in another transmission occasion of the second measurement resource that is configured for interference measurements. A second CQI associated with the interference measurements of the third signal is reported where the first CQI being a different than the second CQI and being associated with the interference measurements of the second signal. According to one or more embodiments of this aspect, observing CQI that has been changed by the at least one of the first predefined power level and second predefined power level for at least in part mitigating CQI saturation. According to one or more embodiments of this aspect, the at least in part mitigating of CQI saturation corresponds to reporting a CQI that has changed from saturated CQI to a non-saturated CQI. According to one or more embodiments of this aspect, interference measurements are performed based on a third signal with a third predefined power level that is received in a transmission occasion of a third measurement resource that is configured for interference measurements. At least one of the first predefined power level, the second predefined power level and the third predefined power level is configured to at least in part mitigate channel quality indication, CQI, saturation.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
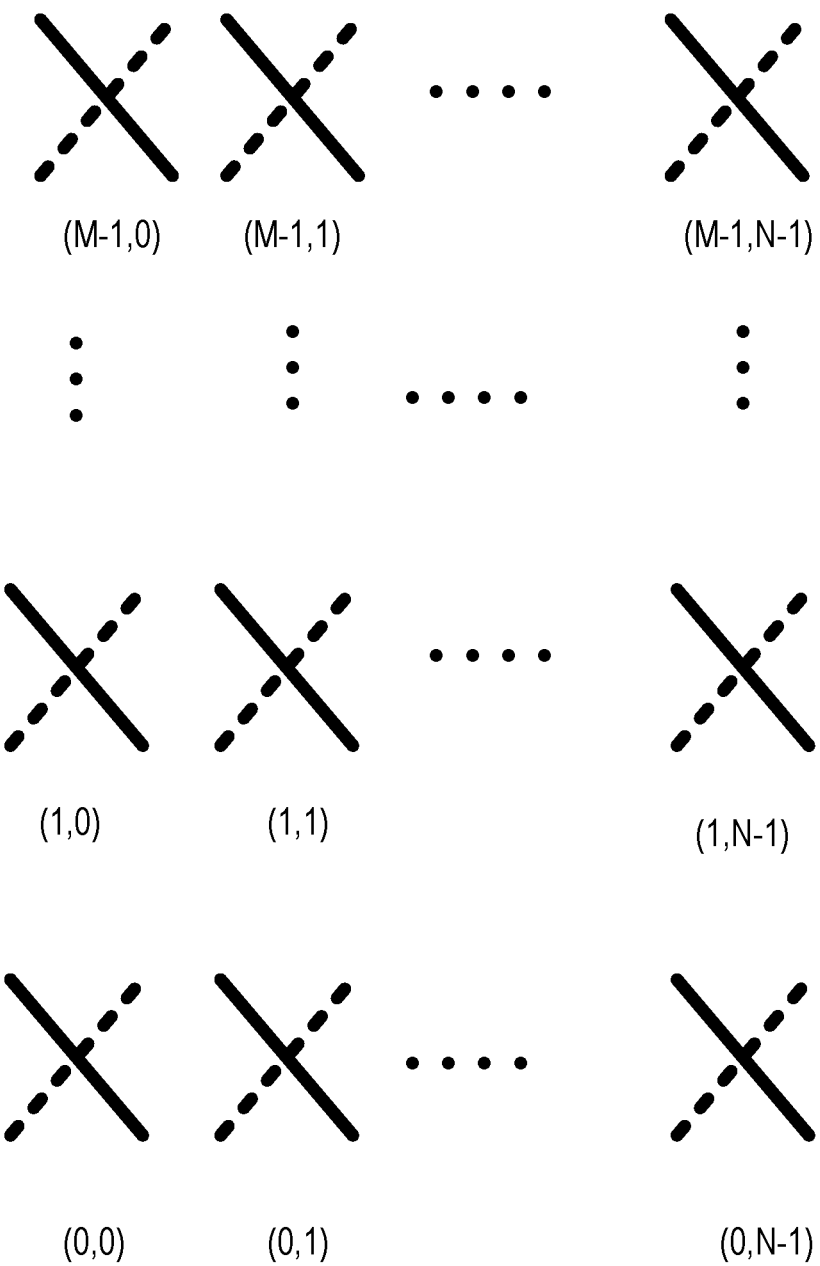
FIG. 1 is a diagram of a two-dimensional antenna element array.
Figure 2:
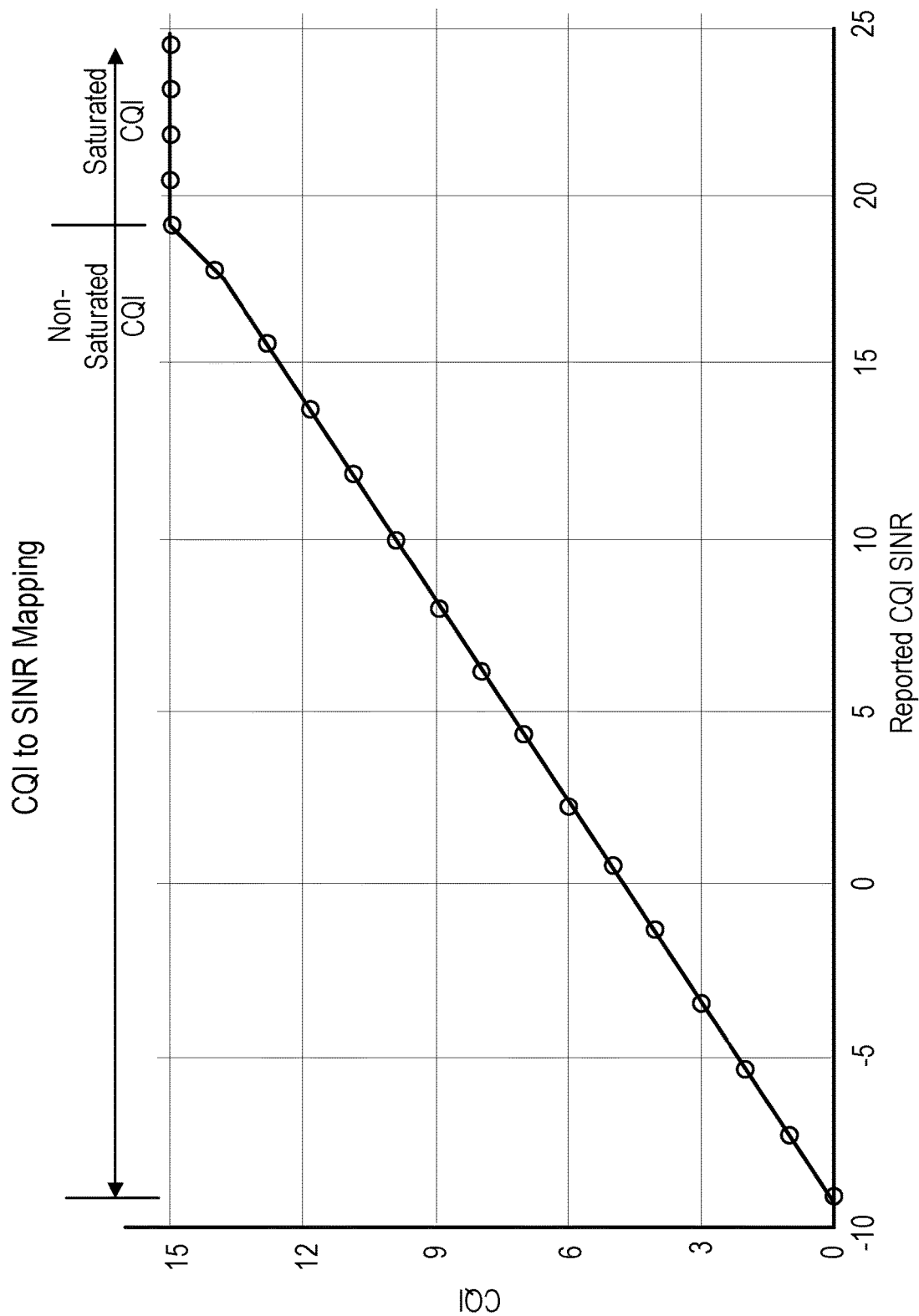
FIG. 2 is a diagram of CQI to SINR mapping with CQI saturation.
Figure 3:
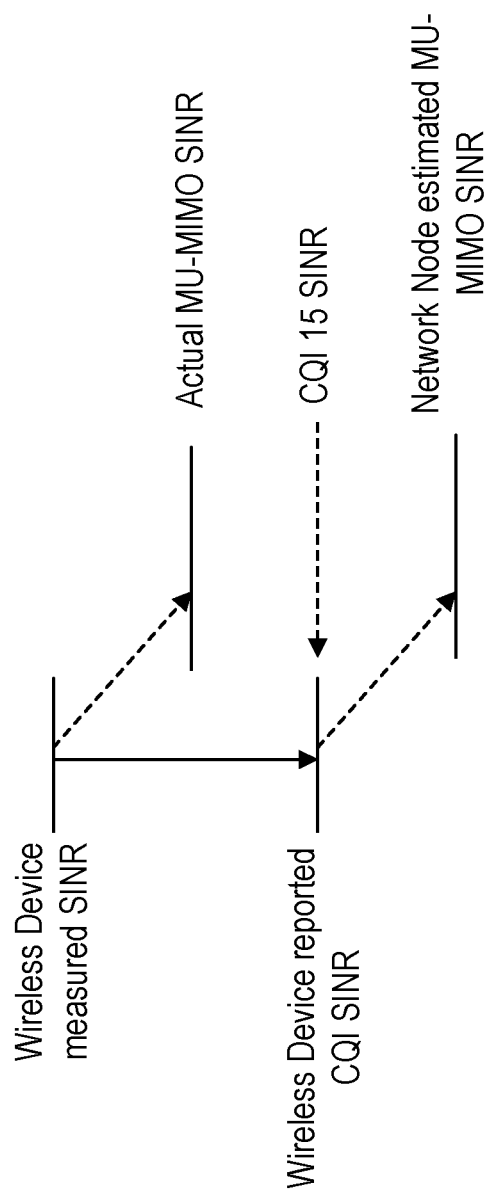
FIG. 3 is a diagram of SINR estimation caused by CQI saturation.

Before describing in detail example embodiments, it is noted that the embodiments reside primarily in combinations of apparatus components and processing steps related to CQI saturation mitigation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) and a user equipment (UE) may be used interchangeably herein. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for CQI saturation mitigation. In one or more embodiments, mitigating CQI saturation refers to reducing a likelihood for CQI saturation and/or preventing CQI saturation.

Figure 4:
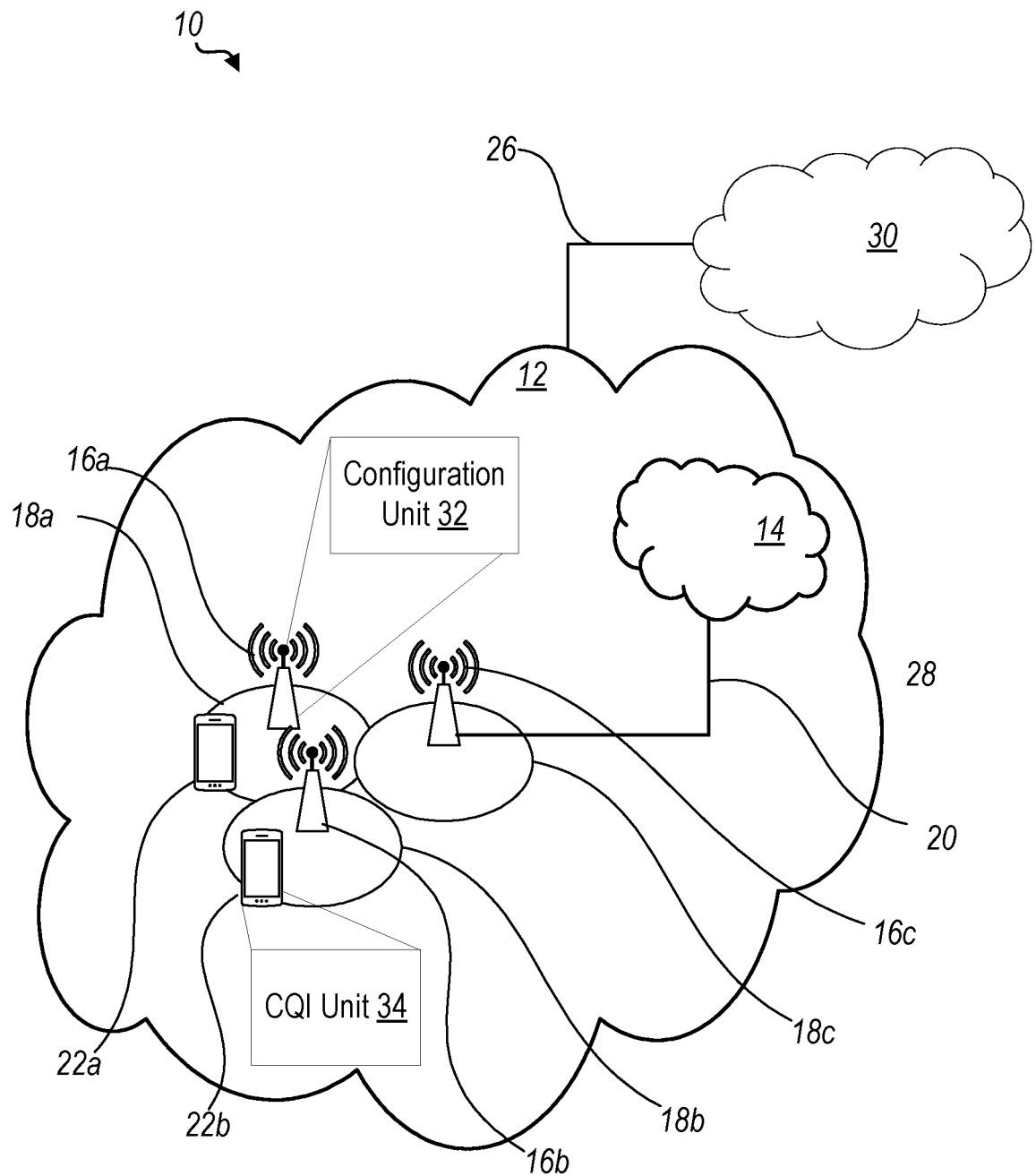
FIG. 4 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform one or more network node 16 functions as described herein such as with respect to CQI saturation mitigation. A wireless device 22 is configured to include a CQI unit 34 which is configured to perform one or more wireless device 22 functions as described herein such as with respect to CQI saturation mitigation.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, analyze, forward, relay, transmit, receive, store, etc., information related to CQI saturation mitigation.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more network node 16 functions as described herein such as with respect to CQI saturation mitigation.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CQI unit 34 configured to perform one or more wireless device 22 functions as described herein such as with respect to CQI saturation mitigation.

Figure 5:
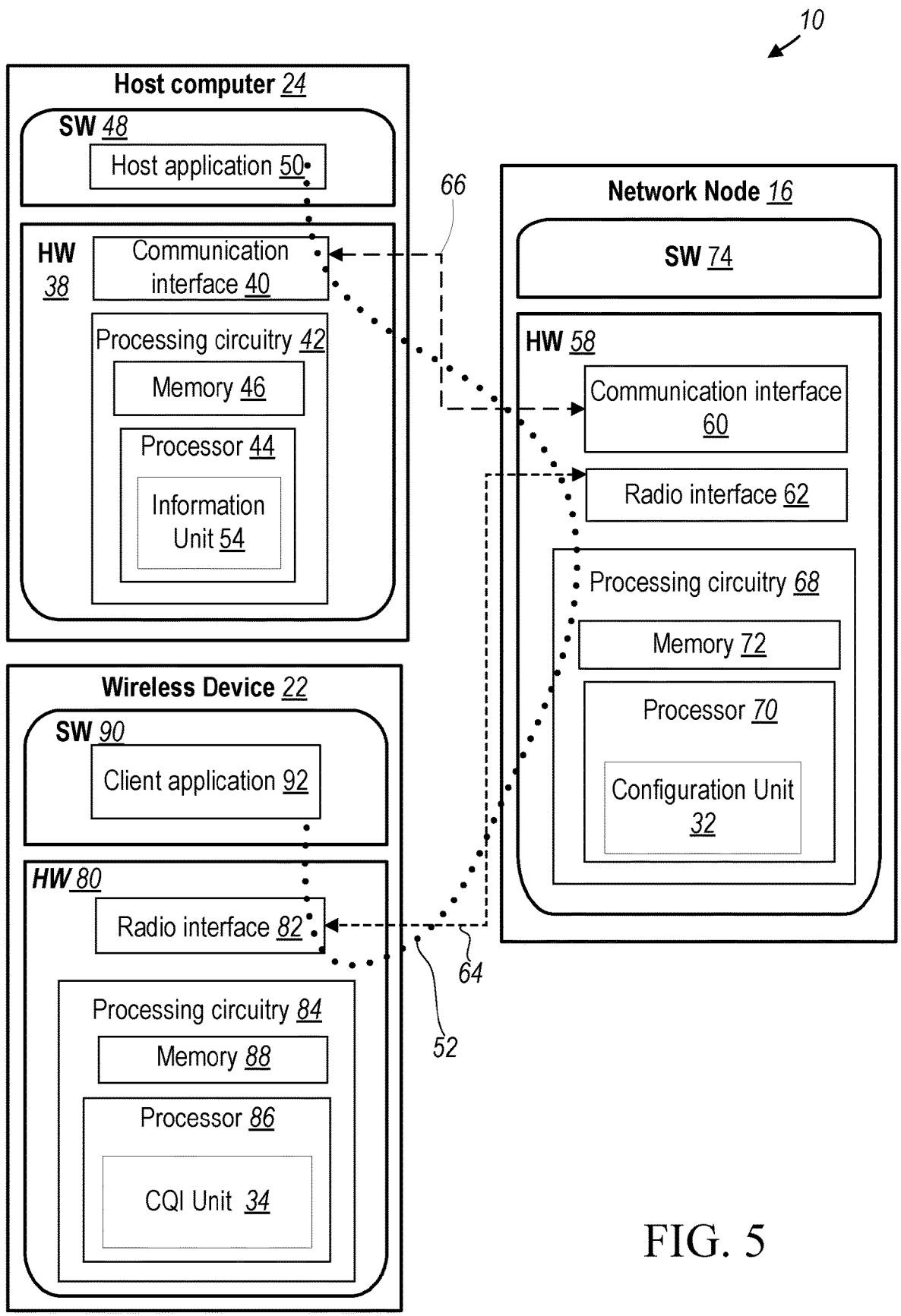
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as configuration unit 32, and CQI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an example method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figures 6, 7:
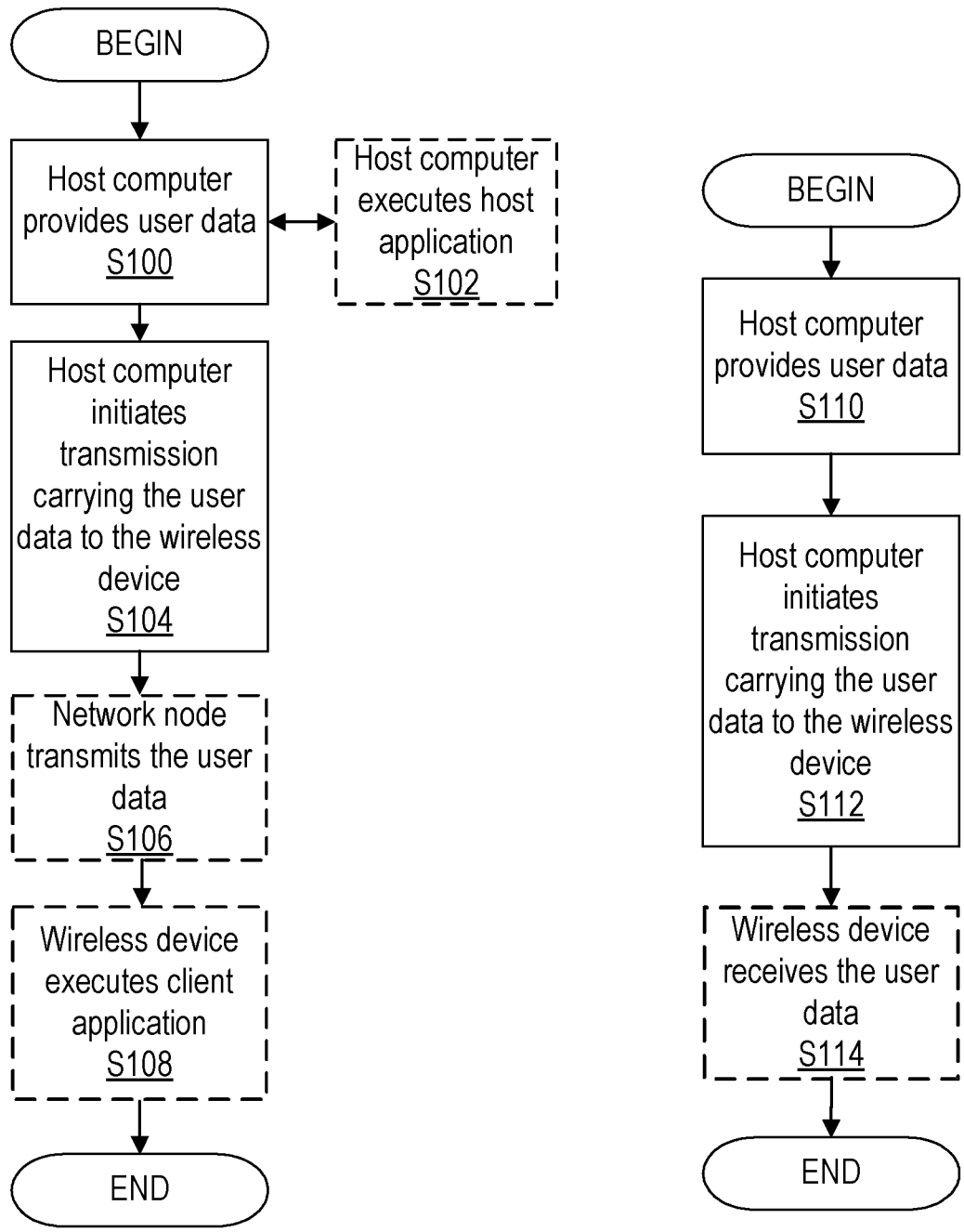
FIG. 6 is a flowchart illustrating example methods implemented in a communication system including a host computer, a network node and a wireless device for executing a client application at a wireless device according to some embodiments of the present disclosure.
FIG. 7 is a flowchart illustrating example methods implemented in a communication system including a host computer, a network node and a wireless device for receiving user data at a wireless device according to some embodiments of the present disclosure.

FIG. 7 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 8, 9:
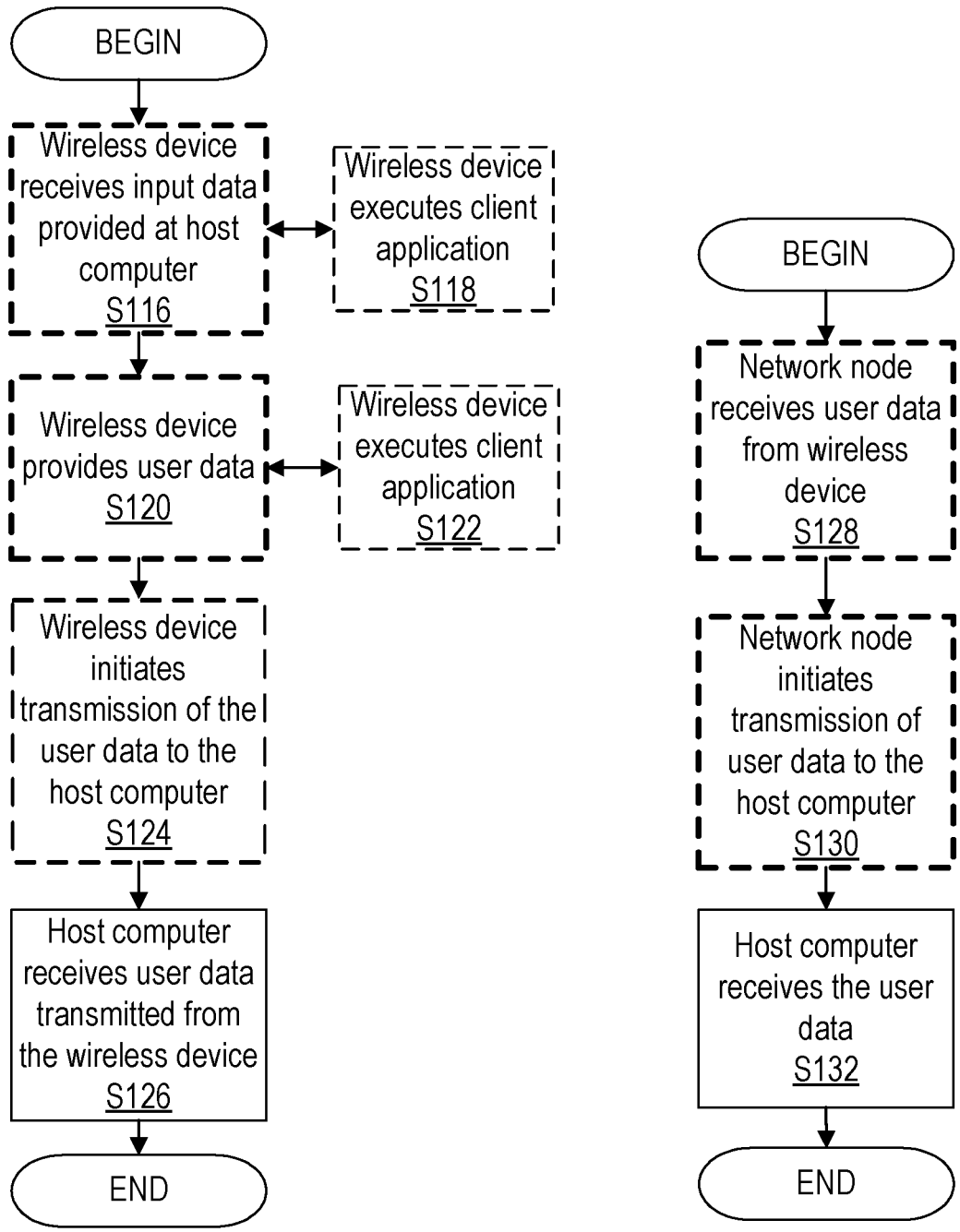
FIG. 8 is a flowchart illustrating example methods implemented in a communication system including a host computer, a network node and a wireless device for receiving user data from the wireless device at a host computer according to some embodiments of the present disclosure.
FIG. 9 is a flowchart illustrating example methods implemented in a communication system including a host computer, a network node and a wireless device for receiving user data at a host computer according to some embodiments of the present disclosure.

FIG. 8 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
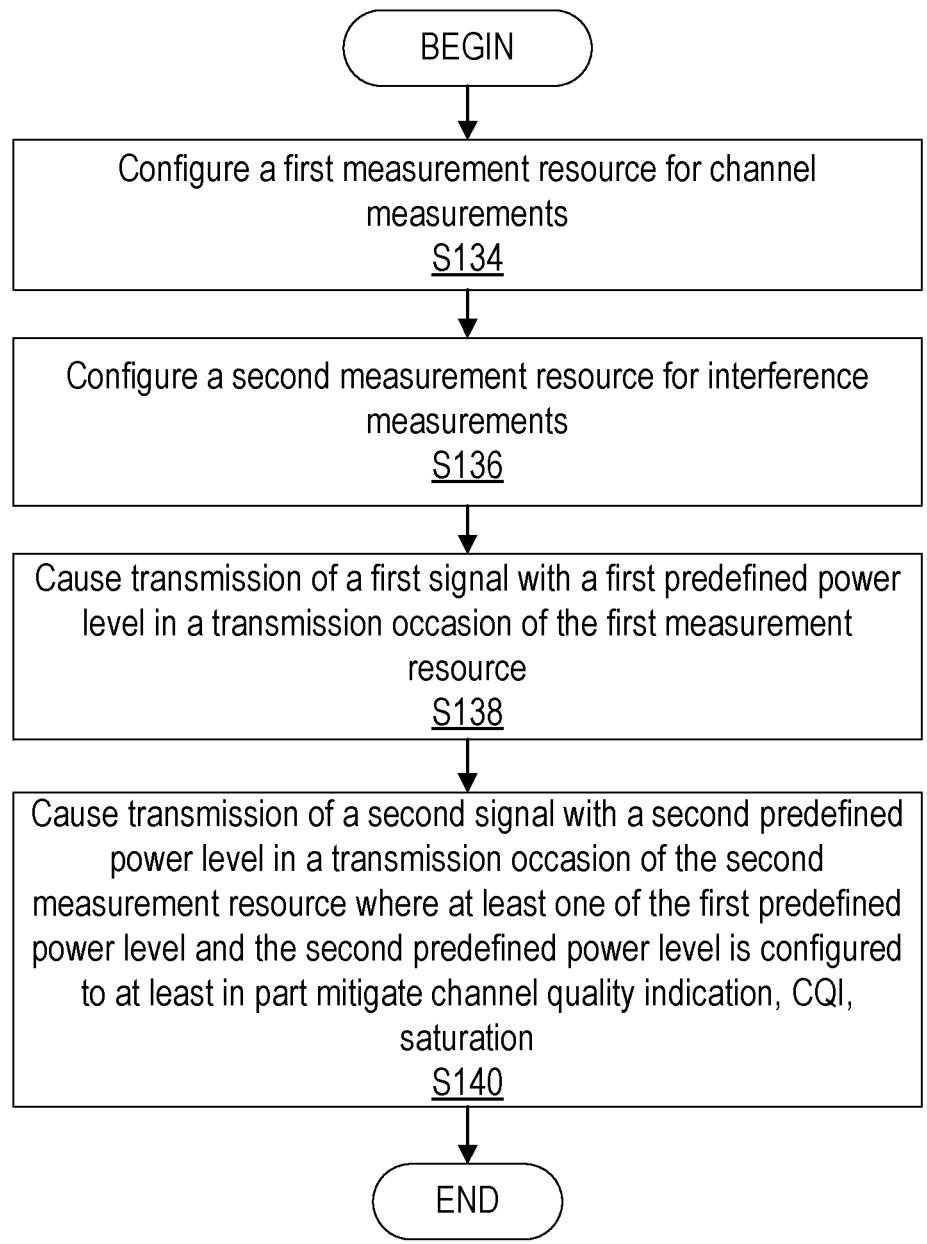
FIG. 10 is a flowchart of an example process in a network node according to some embodiments of the present disclosure.

FIG. 10 is a flowchart of an example process in a network node 16 according to some embodiments of the present disclosure. One or more blocks described herein may be performed by one or more elements of network node 16 such as by one or more of processing circuitry 68 (including the configuration unit 32), processor 70, radio interface 62 and/or communication interface 60. Network node 16 is configured to configure (Block S134) a first measurement resource for channel measurements, as described herein. Network node 16 is configured to configure (Block S136) a second measurement resource for interference measurements, as described herein. Network node 16 is configured to cause (Block S138) transmission of a first signal with a first predefined power level in a transmission occasion of the first measurement resource, as described herein. Network node 16 is configured to cause (Block S140) transmission of a second signal with a second predefined power level in a transmission occasion of the second measurement resource where at least one of the first predefined power level and the second predefined power level is configured to at least in part mitigate channel quality indication, CQI, saturation, as described herein.

According to one or more embodiments, the first measurement resource is a non-zero power channel state information-reference signal, NZP CSI-RS, resource. According to one or more embodiments, the second measurement resource is a channel state information-interference measurement, CSI-IM, resource. According to one or more embodiments, the second measurement resource is a non-zero power channel state information-reference signal, NZP CSI-RS, resource.

According to one or more embodiments, the processing circuitry is further configured to cause transmission of a third signal with a third predefined power level in another transmission occasion of the second measurement resource, receive a first reported CQI associated with the second signal, and receive a second reported CQI associated with the third signal, the first reported CQI being different than the second reported CQI. The processing circuitry is further configured to estimate a signal to interference plus noise ratio, SINR, based on at least one of the first reported CQI and second reported CQI, and perform at least one action based at least in part on the estimated SINR. According to one or more embodiments, the processing circuitry is further configured to receive a first reported CQI associated with the first signal and the second signal, estimate a signal to interference plus noise ratio, SINR, based on the first reported CQI, and perform at least one action based at least in part on the estimated SINR. According to one or more embodiments, the at least one action includes performing at least one of link adaptation and a modulation and coding rate decision.

According to one or more embodiments, the at least one of the first predefined power level and second predefined power level is configured to at least in part mitigate CQI saturation by causing a signal to interference plus noise ratio, SINR, observed by a wireless device 22 to change, the observed SINR mapping to a reportable CQI. According to one or more embodiments, the at least in part mitigating of CQI saturation corresponds to causing a reportable CQI to change from saturated CQI to non-saturated CQI by changing a signal to interference plus noise ratio, SINR, observed by the wireless device 22. According to one or more embodiments, the processing circuitry is further configured to configure a third measurement resource for interference measurements, cause transmission of a third signal with a third predefined power level in a transmission occasion of the third measurement resource, and at least one of the first predefined power level where the second predefined power level and the third predefined power level is configured to at least in part mitigate channel quality indication, CQI, saturation.

Figure 11:
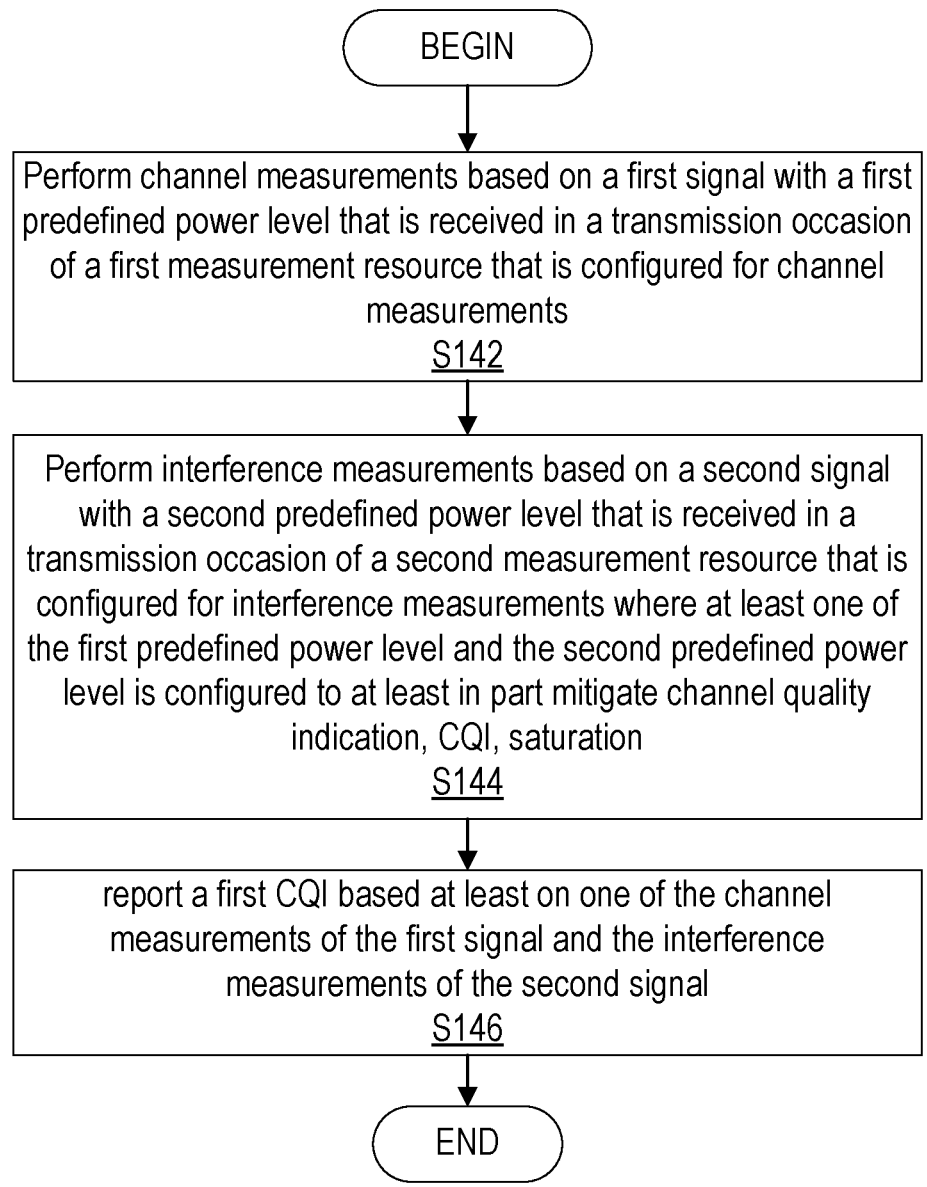
FIG. 11 is a flowchart of an example process in a wireless device according to some embodiments of the present disclosure.

FIG. 11 is a flowchart of an example process in a wireless device 22 according to some embodiments of the present disclosure. One or more blocks described herein may be performed by one or more elements of wireless device 22 such as by one or more of processing circuitry 84 (including the CQI unit 34), processor 86, radio interface 82 and/or communication interface 60. Wireless device 22 is configured to perform (Block S142) channel measurements based on a first signal with a first predefined power level that is received in a transmission occasion of a first measurement resource that is configured for channel measurements, as described herein. Wireless device 22 is configured to perform (Block S144) interference measurements based on a second signal with a second predefined power level that is received in a transmission occasion of a second measurement resource that is configured for interference measurements where at least one of the first predefined power level and the second predefined power level is configured to at least in part mitigate channel quality indication, CQI, saturation, as described herein. Wireless device 22 is configured to report (Block S146) a first CQI based at least on one of the channel measurements of the first signal and the interference measurements of the second signal, as described herein.

According to one or more embodiments, the first measurement resource is a non-zero power channel state information reference signal, NZP CSI-RS, resource. According to one or more embodiments, the second measurement resource is a channel state information-interference measurement, CSI-IM, resource. According to one or more embodiments, the second measurement resource is a non-zero power channel state information reference signal, NZP CSI-RS, resource.

According to one or more embodiments, the processing circuitry is further configured to perform interference measurements based on a third signal with a third predefined power level that is received in another transmission occasion of the second measurement resource that is configured for interference measurements, and report a second CQI associated with the interference measurements of the third signal where the first CQI is a different than the second CQI and is associated with the interference measurements of the second signal.

According to one or more embodiments, the processing circuitry is further configured to observe CQI that has been changed by the at least one of the first predefined power level and second predefined power level for at least in part mitigating CQI saturation. According to one or more embodiments, the at least in part mitigating of CQI saturation corresponds to reporting a CQI that has changed from saturated CQI to a non-saturated CQI. According to one or more embodiments, the processing circuitry is further configured to perform interference measurements based on a third signal with a third predefined power level that is received in a transmission occasion of a third measurement resource that is configured for interference measurements, and where at least one of the first predefined power level, the second predefined power level and the third predefined power level is configured to at least in part mitigate channel quality indication, CQI, saturation, as described herein.

Having generally described arrangements for CQI saturation mitigation, details for these arrangements, functions and processes are provided as follows, and which may be implemented by the network node 16, wireless device 22 and/or host computer 24.

Some embodiments provide CQI saturation mitigation. Network node 16 functionality described below may be performed by at least one of processing circuitry 68, radio interface 62, processor 70, configuration unit 32, etc. Wireless device 22 functionality described below may be performed by at least one of processing circuitry 84, processor 86, radio interface 82, CQI unit 34, etc.

One or more embodiments will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In one embodiment of the method of the present disclosure, one NZP CSI-RS resource for channel measurement and one CSI-IM resource for interference measurement is configured. In some embodiments, in CSI-IM, a signal with a transmission power is transmitted where the transmission power is non-zero. The transmission power is adjusted to control the wireless device 22 observed SINR, thus change/modifying the wireless device 22 reported CQI. In other embodiments, in the time domain, in a first CSI-IM resource transmission occasion, a signal with a first transmission power is transmitted, whereas in a second CSI-IM resource transmission occasion, a signal with a second transmission power level is transmitted so that wireless device 22 can provide two or more kinds of feedbacks, each report is with different SINR where some report(s) may be with a higher SINR, and some report(s) with lower SINR, while a time restrictions for interference measurements may be configured (i.e., configuring "timeRestrictionForInterferenceMeasurements") to avoid the wireless device 22 from performing any interference average across time.

Figure 12:
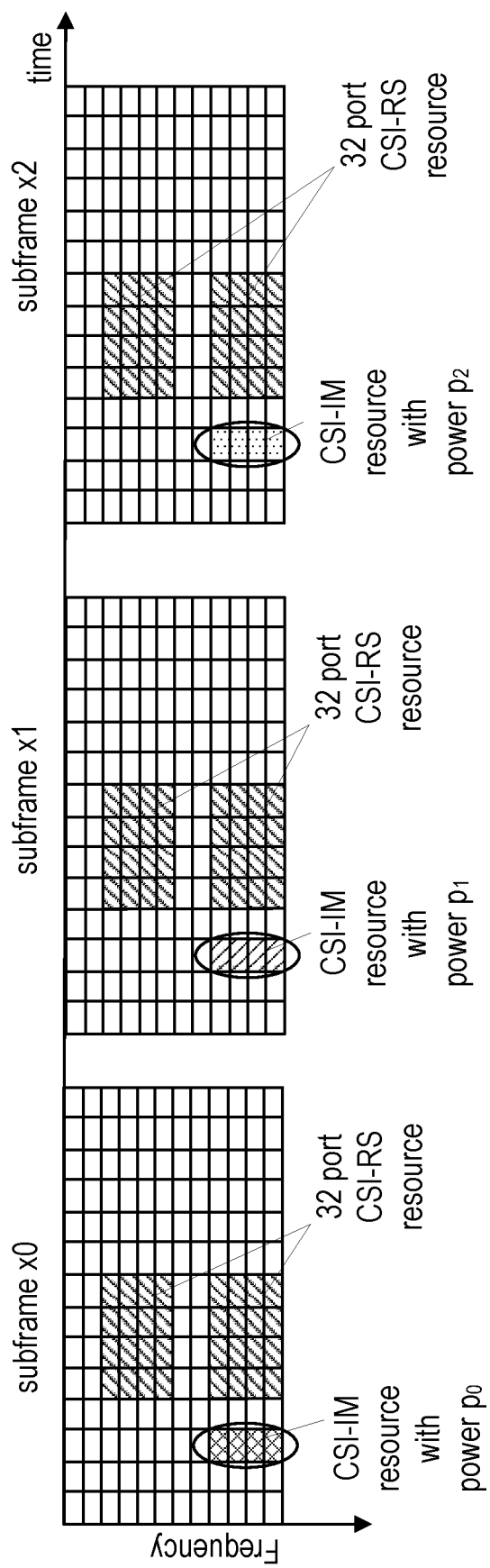
FIG. 12 is a diagram of one CSI-RS resource for channel measurements and one CSI-IM resource for interference measurements according to some embodiments of the present disclosure.

In an embodiment, as shown in FIG. 12, for each PRBs, there are 12 subcarriers in frequency domain and 14 OFDM symbols in time domain, one 32-port CSI-RS resource for channel measurements is configured, marked as blocks with one style of hatching or fill pattern, and one CSI-IM resource for interference measurements is configured, marked as blocks with another style of hatching or fill pattern. As one example, in the x0 subframe, transmission power $p_0$ is transmitted on CSI-IM, in the subframe x1, . . . , xn, transmission power $p_1$, . . . , $p_n$ are applied, respectively, where n is any integer number larger than 1. The pattern can be repetitive with a periodicity. As another example for Alternative 2, assume n=2, the power allocation pattern for CSI-IM could be $p_0, p_1, p_0, p_1, \ldots, p_0, p_1$. As one example for Alternative 1, assume n=1, the power allocation pattern for CSI-IM could be $p_0, p_0, \ldots, p_0$.

At the wireless device 22 side, the wireless device 22 can use the CSI-RS for channel measurements to acquire the channel and use CSI-IM to measure interference and noise, and further derive CQI based on the measured channel and measured the interference and noise. As one example for the CQI derivation, CQI can be given by quantized SINR and SINR could be given by $$\text{SINR} = f(H, I, S_{CSI\_IM}),$$

where H is the channel, $S_{CSI\_IM}$ is the transmitted signal on the CSI-IM, and I is the interference signal on REs of CSI-IM coming from neighbor cells, $f(\cdot)$ is a function, as one simple example for the $f(\cdot)$ could be:

$$f(H, I, \sigma^2) = \frac{\text{trace}(P^H (W_{p2a}^{csirs})^H H^H H W_{p2a}^{csirs} P)}{I + S_{CSI\_IM}}$$

where P is the best precoding matrix selected by the wireless device 22 based on codebook, $W_{p2a}^{csirs}$ is the port to antenna mapping matrix configured in and/or by the network node 16. Assuming the total number of transmission antenna at network node 16 is nTx and the number of Rx antenna at wireless device 22 is nRx, the number of CSI-RS ports is nPorts and the number of layers for PDSCH is nLayers, then matrix P is with dimension nPorts x nLayers, $n_{p2a}^{csirs}$ with dimension nTx x nPorts, H is with dimension nRx x nTx. $(\cdot)^H$ is the conjugate transposition of (·), trace(·) represents the trace of the matrix (·). Given the above equation, on the subframe xk, the interference measured on CSI-IM is given by:

$$S_{CSI\_IM_l} = p_k \cdot \text{trace}((W_{p2a}^{csiim})^H H^H H W_{p2a}^{csiim})$$

where $p_k$ is the transmission power for CSI-IM in the subframe xk, and $W_{p2a}^{csiim}$ is the port to antenna mapping matrix for CSI-IM. Taking into consideration of I, the SINR could be given as:

$$SINR = \frac{\text{trace}(P^H (W_{p2a}^{csirs})^H H^H H W_{p2a}^{csirs} P)}{p_k \cdot \text{trace}((W_{p2a}^{csiim})^H H^H H W_{p2a}^{csiim}) + I}$$

From the above equation, it is illustrated that adjusting $p_k$ can adjust the SINR value, thus further adjust feedback CQI. Setting a proper value for $p_k$ can avoid the CQI saturation.

At the network node 16 side, based on obtained CQI, network node 16 can estimate the SINR and further estimate the I since all the parameters are known except I. As one example, $$I = \frac{\text{trace}(P^H (W_{p2a}^{csirs})^H H^H H W_{p2a}^{csirs} P)}{g(CQI)} - p_k \cdot \text{trace}((W_{p2a}^{csiim})^H H^H H W_{p2a}^{csiim})$$

where g(·) is a function to predict SINR based on CQI report. After I in the example above is calculated, network node 16 may subtract I from CQI to get the true or actual SINR by SINR Network Node 16=SINR_CQI*(CSI_IM/I+1), which now may be higher than the SINR of CQI 15. The basic procedure is shown in the signalling diagram of FIG. 13 that is discussed below.

Figure 13:
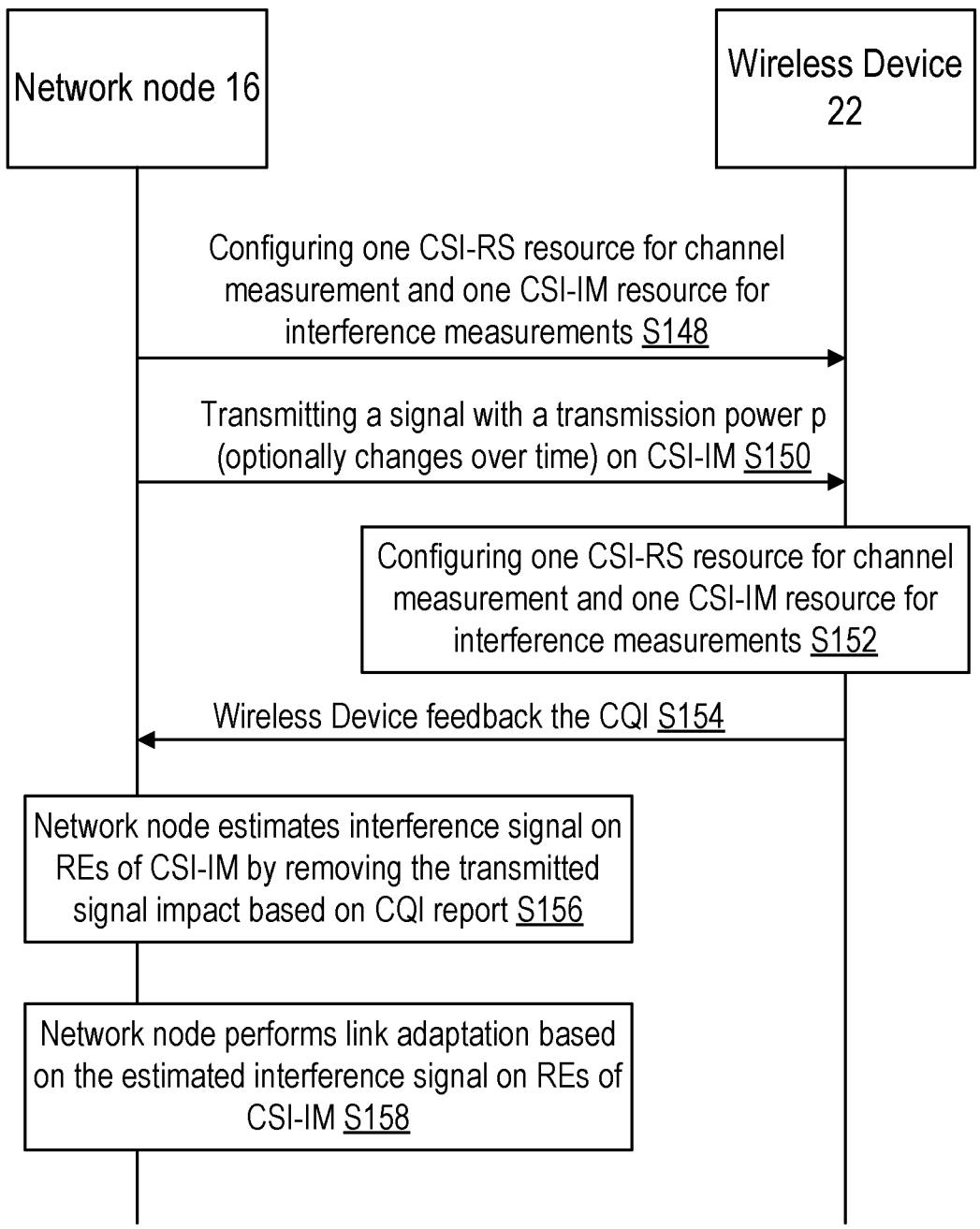
FIG. 13 is a signaling diagram of an interference measurement procedure when one CSI-RS resource and CSI-IM resource are configured according to some embodiments of the present disclosure.

With respect to FIG. 13, network node 16 is configured to configure (Block S148) one CSI-RS source for channel measurement and one CSI-IM resource for interference measurement, as described herein. Network node 16 is configured to cause (Block S150) transmission of a signal with a transmission power p on CSI-IM, as described herein. Wireless device 22 is configured to estimate (Block S152) CQI based on CSI-RS and CSI-IM considering the transmitted signal on the CSI-IM and interference signal on REs of CSI-IM, as described herein. Wireless device 22 is configured to feedback (Block S154) the CQI, as described herein.

The network node 16 is configured to estimate (Block S156) an interference signal on REs of CSI-IM by removing the transmitted signal impact based on the CQI report, as described herein. The network node 16 is configured to perform (Block S158) link adaptation based on the estimated interference signal on RES of CSI-IM, as described herein.

In one embodiment, in case N=2 and two reports can be obtained by network node 16, network node 16 can set $p_0$ to zero and set $p_1$ to non-zero, so that the first report can be used for SU-MIMO, rank-decision, etc. Further, in case CQI is saturated in the lower SINR range for the second report, the first report can be used for interference estimation.

In another embodiment, network node 16 may dynamically decide the transmission power $p_n$ injected on CSI-IM resource in subframe n based on received CQI reports which were determined by the wireless device 22 based on CSI-IM measurement in subframe n−1 (where the injected transmission power on the CSI-IM was $p_{n-1}$). For instance, network node 16 may start by setting $p_0$ equal to zero. If the CQI reported based on CSI-IM measurement in subframe 0 corresponds to the highest CQI value (i.e., CQI=15) and so is saturated, network node 16 may for the subsequent CSI-IM occasion in subframe 1 inject a non-zero transmission power $p_1 > 0$.

Otherwise, if the reported CQI is not saturated, network node 16 may set the transmission power in subframe 1 to zero. Network node 16 may further, in the case where a non-zero transmission power $p_n$ was injected in subframe n and the corresponding reported CQI still was saturated, inject a larger transmission power in subframe n+1 and continue to increase the transmission power injected on CSI-IM resources on subsequent subframes as long as the CQI is saturated.

The beam ($W_{p2a}^{csiim}$) of the CSI-IM can be wide and non-wireless device 22 specific or be narrow and wireless device-specific. When using wide beam for CSI-IM, it allows wireless devices 22 in the cell to use the same CSI-IM signal to derive CQI. When using narrow beam for CSI-IM, there is a benefit in that it allows wireless devices 22 to measure potential interference from a certain Tx direction. By sweeping the narrow CSI-IM beams, as the CQI saturation issue is alleviated, network node 16 may also obtain measurements of interference from interested Tx directions.

In an embodiment, the method includes configuring one CSI-RS resource for channel measurements and two or more CSI-IM resources for interference measurements. In some embodiments, in a first CSI-IM resource, a signal with the first transmission power is transmitted. In a second CSI-IM resource, a signal with a second transmission power is transmitted. Multiple trigger states are defined for CSI report. At least one trigger state is associated with the report with the first CSI-IM resource and another trigger state is associated with the report with the second CSI-IM resource. Thus, multiple CQIs can be reported by wireless device 22 by triggering different trigger states at different time occasions.

Figure 14:
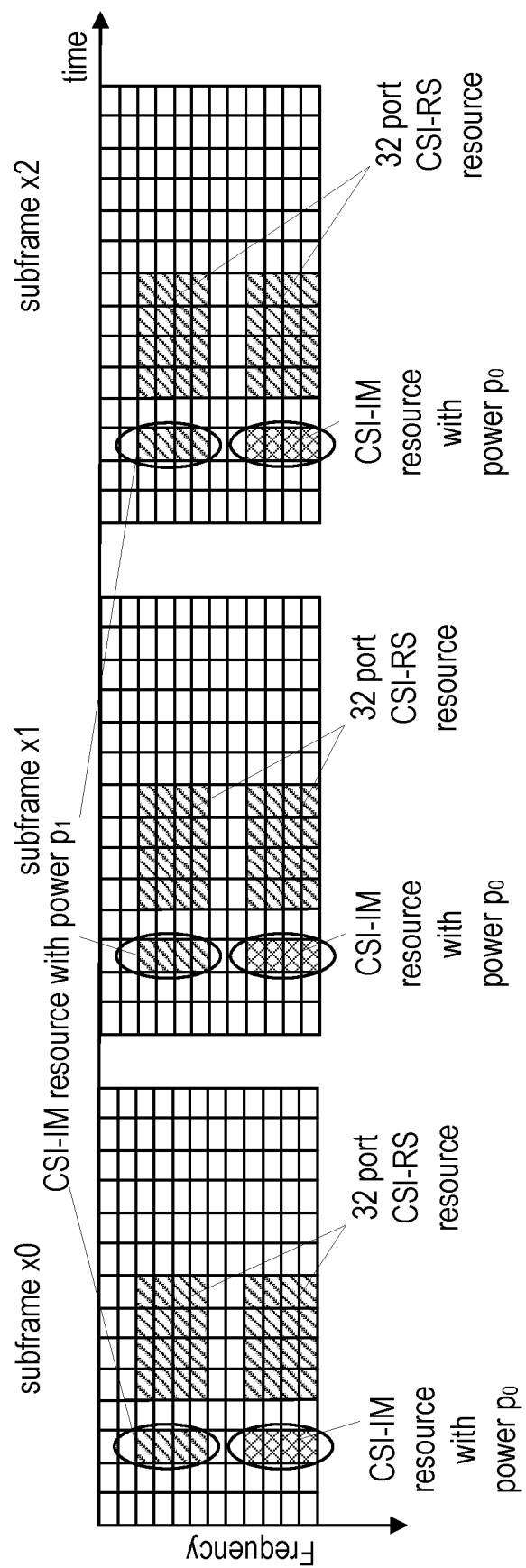
FIG. 14 is a diagram of one CSI-RS resources for channel measurements and two CSI-IM resources for interference measurements according to some embodiments of the disclosure.

As shown in FIG. 14, one 32-port CSI-RS resource for channel measurements is configured, marked as blocks with a particular hatching or filled pattern style, two CSI-IM resources for interference measurements, wherein the first CSI-IM resource is marked with another hatching or fill pattern style and the second CSI-IM resource is marked with yet another hatching or fill pattern style. On the first CSI-IM resource, the signal with transmission power $p_0$ is transmitted, whereas, on the second CSI-IM resource, the signal with transmission $p_1$ is transmitted.

As one example, $p_0$ can be set to zero and $p_1$ can be set into a non-zero value. Thus, the first CSI-IM can be used to avoid low-SNR saturation issue, and the second CSI-IM can be used for high-SNR saturation issue.

In order to reduce the wireless device 22 capability requirements, CSI trigger states, CSI-RS resource sets and CSI report setting may be taken into account and particularly designed.

According to 3GPP TS 38.214, for a CSI report, a wireless device 22 is configured by higher layers with N≥1 CSI- ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. For aperiodic CSI report triggering, a single set of CSI triggering states are higher layer configured. A trigger state is initiated using the CSI request field in DCI. For a wireless device 22 configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting is associated with the trigger state, and the wireless device 22 is higher layer configured per trigger state per Resource Setting to select the one CSI-IM/NZP CSI-RS resource set from the Resource Setting.

Based on the above rules, one CSI-ReportConfig can be defined. In the CSI-ReportConfig, it associates the CSI report with a plurality of CSI-ResourceConfig Resource Settings. In the CSI-ResourceConfig Resource Setting, one NZP-CSI-RS-Resource set (NZP-CSI-RS-ResourceSet #0) for channel measurements and two csi-IM-ResourceSets (csi-IM-ResourceSet #0 and CSI-IM-ResourceSet #1) for interference measurements are defined. Two trigger states in CSI-AperiodicTriggerStateList are configured, one trigger state (TriggerState #0) is used to select NZP-CSI-RS-ResourceSet #0 for channel measurements and csi-IM-ResourceSet #0 for interference measurements, and the other trigger state (TriggerState #1) is used to select NZP-CSI-RS-ResourceSet #0 for channel measurements and csi-IM-ResourceSet #1 for interference measurements. In a first slot, TriggerState #0 is initiated using DCI in one downlink slot and TriggerState #1 is initiated using DCI in another downlink slot. The SINR corresponding to the TriggerState #0 can be given by $$SINR_0 = \frac{\text{trace}(P^H (W_{p2a}^{csirs})^H H^H H W_{p2a}^{csirs} P)}{p_0 \cdot \text{trace}((W_{p2a}^{csiim})^H H^H H W_{p2a}^{csiim}) + I},$$

And the SINR corresponding to the triggerState #1 can be given by:

$$SINR_1 = \frac{\text{trace}(P^H (W_{p2a}^{csirs})^H H^H H W_{p2a}^{csirs} P)}{p_1 \cdot \text{trace}((W_{p2a}^{csiim})^H H^H H W_{p2a}^{csiim}) + I},$$

The difference between the two trigger states is the transmit power of CSI-IM is different. With the above-mentioned method/embodiment(s), assuming $p_0 < p_1$, $SINR_0$ can be used for SU-MIMO link adaptation, or used to avoid the lower SINR saturation issue, $SINR_1$ can be used for MU-MIMO link adaptation or used to avoid the higher SINR saturation issue.

In a variant of the previous embodiment, two aperiodic CSI Report Settings, a first and a second, are configured and mapped to individual trigger states. The first CSI Report Setting is associated with one periodic NZP CSI-RS resource for channel measurement and one periodic CSI-IM resource for interference measurement, where a first transmission power (which may typically be equal to zero) is injected on the periodic CSI-IM resource. Since these resources are periodic, they are transmitted with a certain periodicity and slot offset.

The second CSI Report Setting is associated with one aperiodic NZP CSI-RS resource for channel measurement and one aperiodic CSI-IM resource for interference measurement, where a second transmission power (which may typically be larger than zero) is injected on the aperiodic CSI-IM resource. The aperiodic CSI-RS resource is configured to occupy the same resource element within a slot as the periodic CSI-RS resource while the aperiodic CSI-IM resource do not occupy the same resource elements as the periodic CSI-IM resource. Since these resources are aperiodic, they are only present from a wireless device 22 perspective in the slot wherein the triggering DCI is transmitted.

With such configuration, network node 16 can trigger the second CSI Report Setting in the same slot wherein an occasion of the periodic CSI-RS resource is present. The periodic and aperiodic CSI-RS resource will thus "overlap" from wireless device 22 perspective, implying that network node 16 only needs to transmit one CSI-RS resource which reduces CSI-RS overhead.

In an embodiment, one CSI-RS resource for channel measrurements and one nzp-CSI-RS-Resource for interfernece measurements are configured. For the power transmission for the nzp-CSI-RS-ResourceForInterference, there are two alternatives. In the first alternative, a fixed transmission power is used for nzp-CSI-RS-ResourceForInterference. The power is determined so that the wireless device 22's CQI is not saturated. As a further embodiment, in order to provide wireless device 22 specific CQI determination, the transmission power for nzp-CSI-RS-ResourceForInterference is fixed, and a different wireless device 22 may use different powerControlOffset. For cell-center wireless device 22, larger powerControlOffset may be informed, and for cell-edge wireless device 22, smaller powerControlOffset may be informed.

In an additional embodiment, different transmission power is applied for the nzp-CSI-RS-Resource for interference measurements over time. More specifically, in a first nzp-CSI-RS-ResourcesForInterference resource transmission occasion, a signal with a first transmission power is transmitted, whereas in a second nzp-CSI-RS-ResourcesForInterference resource transmission occasion, a signal with a second transmission power level is transmitted, so that the wireless device 22 can provide two or more kinds of feedbacks, each report is with different SINR, some is with higher SINR and some is with lower SINR. In order to avoid wireless device 22 to perform any interference average across time, where a time restriction for interference measurements is configured, i.e., "timeRestrictionForInterferenceMeasurements" is configured.

In an additional embodiment, at network node 16 side, since the transmission power of nzp-CSI-RS-ResourcesForInterference is known, and the channel for the nzp-CSI-RS-ResourcesForInterference is known as well, thus, the interference of other cells can be estimated. Similarly, controlling the power of nzp-CSI-RS-ResourcesForInterference, the SINR range can be controlled, thus control the CQI range.

In an additional embodiment, in a first nzp-CSI-RS-ResourceForInterference, signal with the first transmission power is transmitted. A second nzp-CSI-RS-ResourceForInterference, a signal with a second transmission power is transmitted, so that the wireless device 22 can feedback a plurality of feedback where each feedback is associated with a different SINR, thus the CQI saturation issue can be eliminated.

In an additional embodiment, same REs and same transmission power is applied to two nzp-CSI-RS-ResourcesForInterference, but different powerControlOffset is associated with nzp-CSI-RS-ResourcesForInterference. In some embodiments, powerControlOffset is not necessarily equal to the transmission power and may only be used for CSI calculation. Since the same REs are used, although two nzp-CSI-RS-ResourcesForInterference are configured, the overhead to transmit two nzp-CSI-RS-ResourcesForInterference is the same as that for one nzp-CSI-RS-ResourceForInterference. As a result, the CSI-RS overhead is reduced.

The corresponding CSI report configuration and CSI resource configuration is described herein. More specifically, In the CSI-ResourceConfig Resource Setting, one NZP-CSI-RS-Resource set (NZP-CSI-RS-ResourceSet #0) for channel measurements and two sets of nzp-CSI-RS-ResourcesForInterference (nzp-CSI-RS-ResourcesForInterference #0 and nzp-CSI-RS-ResourcesForInterference #1) are defined. Two trigger states in CSI-AperiodicTriggerStateList are configured, one trigger state (TriggerState #0) is used to select NZP-CSI-RS-ResourceSet #0 for channel measurements and nzp-CSI-RS-ResourcesForInterference #0 for interference measurements, and the other trigger state (TriggerState #1) is used to select NZP-CSI-RS-ResourceSet #0 for channel measurements and nzp-CSI-RS-ResourcesForInterference #1 for interference measurements. In a first slot, TriggerState #0 is initiated using downlink control information (DCI) in one downlink slot and TriggerState #1 is initiated using DCI in another downlink slot. The SINR corresponding to the TriggerState #0 can be given by $$SINR = \frac{\text{trace}(P^H (W_{p2a}^{csirs})^H H^H H W_{p2a}^{csirs} P)}{p_0 \cdot \text{trace}((W_{p2a}^{nzp\_inter})^H H^H H W_{p2a}^{nzp\_inter}) + I},$$

And the SINR corresponding to the triggerState #1 can be given by:

$$SINR = \frac{\text{trace}(P^H (W_{p2a}^{csirs})^H H^H H W_{p2a}^{csirs} P)}{p_1 \cdot \text{trace}((W_{p2a}^{nzp\_inter})^H H^H H W_{p2a}^{nzp\_inter}) + I},$$

where $W_{p2a}^{nzp\_inter}$ is the port to antenna mapping for nzp-CSI-RS-ResourcesForInterference. For alternative 1, $p_0$ and $p_1$ are the actual transmitted power for nzp-CSI-RS-ResourcesForInterference. For alternative 2, $p_0$ and $p_1$ are the powerControlOffset for the first and second set of nzp-CSI-RS-ResourcesForInterference.

In an embodiment, upon checking the wireless device 22 CQI report, if the CQI report is larger than a first threshold for a first time-duration, network node 16 uses RRC to configure the first powerControlOffset for the CSI-RS resource for channel measurements for the given wireless device 22. Otherwise, network node 16 uses RRC to configure the second powerControlOffset for the CSI resource for channel measurements, so that wireless device 22 can have different back off for the CQI report. Thus, the CQI saturation issues can be mitigated.

At least some of the above-mentioned embodiments can be combined to mitigate the CQI saturation issue.

In some embodiments, the following are configured: one CSI-RS resource for channel measurements, one csi-IM-ResourcesForInterference, and two nzp-CSI-RS-ResourcesForInterference. These two nzp-CSI-RS-ResourcesForInterference can be with different transmission power or different powerControlOffset.

In some embodiments, the following are configured: one CSI-RS resource for channel measurements, two csi-IM-ResourcesForInterference, and one nzp-CSI-RS-ResourcesForInterference. These two csi-IM-ResourcesForInterference can be with different transmission power.

One or more embodiments described herein may be applied to TDD systems. One or more embodiments described herein that, for example, use RRC to reconfigure the offset may be applied to TDD and/or FDD systems.

SOME EXAMPLES

Example 1

A method performed by a network node 16 for mitigate downlink channel state information (CQI) saturation, the method comprising:
configuring one NZP CSI-RS resource for channel measurements and one CSI-IM resource for interference measurements.

Example 2

The method of Example 1, wherein in CSI-IM, transmitting a signal with a non-zero transmission power, the transmission power being adjusted to control the wireless device 22 observed SINR thus change the wireless device 22 reported CQI.

Example 3

The method of Example 1, wherein in time domain, in a first CSI-IM resource transmission occasion, transmitting a signal with a first transmission power, whereas in a second CSI-IM resource transmission occasion, transmitting a signal with a second transmission power level, wherein a wireless device 22 can provide two or more kinds of feedbacks over time, each report is with different SINR, some is with higher SINR, and some is with lower SINR.

Example 4

The method of Example 3, wherein configuring "timeRestrictionForInterferenceMeasurements" to avoid wireless device 22 to perform any interference average across time.

Example 5

A method performed by a base station for mitigate downlink channel state information (CQI) saturation, the method comprising:
configuring one NZP CSI-RS resource for channel measurements and two or more CSI-IM resources for interference measurements.

Example 6

The method of Example 5, wherein in a first CSI-IM resource, transmitting a signal with the first transmission power and, in a second CSI-IM resource, transmitting a signal with a second transmission power.

Example 7

The method of Example 5, wherein multiple trigger states are defined for CSI report, wherein at least one trigger state is associated with the report with the first CSI-IM resource and another trigger state is associated with the report with the second CSI-IM resource, allowing multiple CQIs can be reported by a wireless device 22.

Example 8

A method performed by a base station for mitigate downlink channel state information (CQI) saturation, the method comprising:
configuring one NZP CSI-RS resource for channel measurements and one NZP-CSI-RS-Resource for Interference measurements.

Example 9

The method of Example 8, wherein transmitting nzp-CSI-RS-ResourcesForInterference, wherein the transmission power is used to control the wireless device 22 observed SINR thus change a wireless device 22 reported CQI.

Example 10

The method of Example 8, wherein in time domain, in a first nzp-CSI-RS-ResourcesForInterference resource transmission occasion, transmitting a signal with a first transmission power, whereas in a second nzp-CSI-RS-ResourcesForInterference resource transmission occasion, transmitting a signal with a second transmission power level, wherein the wireless device 22 can provide two or more kinds of feedbacks, each report is with different SINR, some is with higher SINR and some is with lower SINR.

Example 11

The method of Example 10, wherein configuring "timeRestrictionForInterferenceMeasurements" to avoid wireless device 22 to perform any interference average across time.

Example 12

A method performed by a network node 16 for mitigate downlink channel state information (CQI) saturation, the method comprising:
configuring one NZP CSI-RS resource for channel measurements and two or more nzp-CSI-RS-Resources for interference measurements.

Example 13

The method of Example 12, wherein in a first nzp-CSI-RS-ResourcesForInterference, transmitting a signal with the first transmission power, and in a second nzp-CSI-RS-ResourceForInterference, transmitting a signal with a second transmission power, wherein the wireless device 22 can feedback a plurality of feedback, each feedback is with different SINR, thus the CQI saturation issue can be eliminated.

Example 14

The method of Example 12, wherein same REs and same transmission power are applied to two nzp-CSI-RS-ResourcesForInterference, but different powerControlOffset is associated with nzp-CSI-RS-ResourcesForInterference.

Example 15

A method performed by a network node 16 to mitigate downlink channel state information (CQI) saturation, the method comprising:
configuring one CSI-RS resource for channel measurements and using RRC to configure the powerControlOffset based on wireless device 22 condition.

Example 16

The method of Example 16, wherein checking the wireless device 22 CQI report, if the CQI report is larger than a first threshold for a first time-duration, network node 16 uses RRC to configure the first powerControlOffset for the CSI-RS resource for channel measurements for the given wireless device 22, otherwise, network node 16 uses RRC to configure the second powerControlOffset for the CSI resource for channel measurements, so that wireless device 22 can have different back off for the CQI report, where the CQI saturation issues can be mitigated.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

At least some of the following abbreviations may be used in this disclosure. If there is an inconsistency between abbreviations, preference should be given to how it is used above. If listed multiple times below, the first listing should be preferred over any subsequent listing(s).

AAS Active Antenna System
CQI Channel Quality Indicator
PDSCH Physical Downlink Shared Channel
EPRE Energy per Resource Element
CSI-RS Channel State Information Reference Signal
NZP-CSI-RS Non-zero power CSI-RS
DFT Discrete Fourier Transform
MU-MIMO Multi-User MIMO
PMI Precoding Matrix Indicator
RI Rank Indication
SRS Sounding Reference Signal
TTI Transmission Time Interval
1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
   processing circuitry configured to:
   configure a first measurement resource for channel measurements;
   configure a second measurement resource for interference measurements;
   cause transmission of a first signal with a first predefined power level in a transmission occasion of the first measurement resource;
   cause transmission of a second signal with a second predefined power level in a transmission occasion of the second measurement resource, at least one of the first predefined power level and the second predefined power level is configured to at least in part mitigate channel quality indication, CQI, saturations;
   cause transmission of a third signal with a third predefined power level in another transmission occasion of the second measurement resource;
   receive a first reported CQI associated with the second signal;
   receive a second reported CQI associated with the third signal, the first reported CQI being different than the second reported CQI;
   estimate a signal to interference plus noise ratio, SINR, based on at least one of the first reported CQI and second reported CQI; and
   perform at least one action based at least in part on the estimated SINR.

2. The network node of claim 1, wherein the first measurement resource is a non-zero power channel state information-reference signal, NZP CSI-RS, resource.

3. The network node of claim 1, wherein the second measurement resource is a channel state information-interference measurement, CSI-IM, resource.

4. The network node of claim 1, wherein the second measurement resource is a non-zero power channel state information-reference signal, NZP CSI-RS, resource.

5. The network node of claim 1, wherein the at least one action includes performing at least one of link adaptation and a modulation and coding rate decision.

6. The network node of claim 1, wherein the at least one of the first predefined power level and second predefined power level is configured to at least in part mitigate CQI saturation by causing a signal to interference plus noise ratio, SINR, observed by a wireless device to change, the observed SINR mapping to a reportable CQI.

7. The network node of claim 1, wherein the at least in part mitigating of CQI saturation corresponds to causing a reportable CQI to change from saturated CQI to non-saturated CQI by changing a signal to interference plus noise ratio, SINR, observed by the wireless device.

8. The network node of claim 1, wherein the processing circuitry is further configured to:
   configure a third measurement resource for interference measurements;
   cause transmission of the third signal with the third predefined power level in a transmission occasion of the third measurement resource; and
   at least one of the first predefined power level, the second predefined power level and the third predefined power level being configured to at least in part mitigate channel quality indication, CQI, saturation.

9. A method implemented by a network node that is configured to communicate with a wireless device, the method comprising:
configuring a first measurement resource for channel measurements;
configuring a second measurement resource for interference measurements;
causing transmission of a first signal with a first predefined power level in a transmission occasion of the first measurement resource; and
causing transmission of a second signal with a second predefined power level in a transmission occasion of the second measurement resource, at least one of the first predefined power level and the second predefined power level is configured to at least in part mitigate channel quality indication, CQI, saturations;
causing transmission of a third signal with a third predefined power level in another transmission occasion of the second measurement resource;
receiving a first reported CQI associated with the second signal;
receiving a second reported CQI associated with the third signal, the first reported CQI being different than the second reported CQI;
estimating a signal to interference plus noise ratio, SINR, based on at least one of the first reported CQI and second reported CQI; and
performing at least one action based at least in part on the estimated SINR.

10. The method of claim 9, wherein the first measurement resource is a non-zero power channel state information-reference signal, NZP CSI-RS, resource.

11. The method of claim 9, wherein the second measurement resource is a channel state information-interference measurement, CSI-IM, resource.

12. The method of claim 9, wherein the second measurement resource is a non-zero power channel state information-reference signal, NZP CSI-RS, resource.

13. The method of claim 9, wherein the at least one action includes performing at least one of link adaptation and a modulation and coding rate decision.

14. The method of claim 9, wherein the at least one of the first predefined power level and second predefined power level is configured to at least in part mitigate CQI saturation by causing a signal to interference plus noise ratio, SINR, observed by a wireless device to change, the observed SINR mapping to a reportable CQI.

15. The method of claim 9, wherein the at least in part mitigating of CQI saturation corresponds to causing a reportable CQI to change from saturated CQI to non-saturated CQI by changing a signal to interference plus noise ratio, SINR, observed by the wireless device.

16. The method of claim 9, further comprising:
configuring a third measurement resource for interference measurements;
causing transmission of the third signal with the third predefined power level in a transmission occasion of the third measurement resource; and
at least one of the first predefined power level, the second predefined power level and the third predefined power level being configured to at least in part mitigate channel quality indication, CQI, saturation.

* * * * *